United States Patent
Wittner et al.

[11] Patent Number: 5,956,222
[45] Date of Patent: Sep. 21, 1999

[54] ELECTRONIC SWITCH FOR QUICK, AUTOMATIC RESPONSE TO CURRENT OVERLOADS

[75] Inventors: Lupu Wittner; Eduard Konstantinovsky, both of Netanya, Israel

[73] Assignee: Target Hi-Tec Electronics Ltd., Netanya, Israel

[21] Appl. No.: 08/926,686

[22] Filed: Sep. 10, 1997

[51] Int. Cl.$^6$ .................................................. H01H 73/00
[52] U.S. Cl. ................................ 361/115; 361/93; 361/8; 361/9; 361/13
[58] Field of Search ............................. 361/8, 9, 13, 93, 361/115; 307/115, 134

[56] References Cited

U.S. PATENT DOCUMENTS

| | | | |
|---|---|---|---|
| 4,420,784 | 12/1983 | Chen et al. | 361/7 |
| 4,532,570 | 7/1985 | Thornley et al. | 361/93 |
| 4,652,962 | 3/1987 | Howell | 361/3 |
| 4,704,652 | 11/1987 | Billings | 361/8 |
| 4,772,809 | 9/1988 | Koga et al. | 307/140 |
| 4,992,904 | 2/1991 | Spencer et al. | 361/5 |
| 5,508,878 | 4/1996 | Pecore | 361/195 |
| 5,528,131 | 6/1996 | Marty et al. | 323/901 |

*Primary Examiner*—Jeffrey A. Gaffin
*Assistant Examiner*—Kim N. Huynh
*Attorney, Agent, or Firm*—Mark M. Friedman

[57] ABSTRACT

An electronic switch circuit for controlling a main circuit including a power source and a load, the electronic switch circuit including (a) an electromagnetic relay device including an electromagnet and at least two contacts, the electromagnetic relay device being connectable in series to the power source and the load of the main circuit; (b) a controlled semiconductor device being a part of the electronic switch circuit; (c) a semiconductor command circuit being connected to the semiconductor device, the semiconductor command circuit serving for controlling the operation of the controlled semiconductor device; (d) a relay command circuit being connected to the electromagnet of the electromagnetic relay device and to the semiconductor command circuit, the relay command circuit serving for controlling the relay device and the semiconductor command circuit; (e) an overload sensor serving for determining a current load flowing through the main circuit and for reporting the relay command circuit of a current overload; (f) a resistor being connected in series to the controlled semiconductor device; and (g) an inducer being connectable in series to the load, the inducer being positioned in close proximity to the electromagnet of the electromagnetic relay device; wherein when the contacts of the relay device are disconnected, the resistor which thereby experiences a higher current load, automatically signals the semiconductor command circuit, which in turn turns the controlled semiconductor device off; and further wherein when the inducer experiences a current load above a predetermined threshold the inducer generates an induction field of a magnitude sufficient to induce the electromagnet of the electromagnetic relay device to disconnect the contacts.

6 Claims, 1 Drawing Sheet

ELECTRONIC SWITCH FOR QUICK, AUTOMATIC RESPONSE TO CURRENT OVERLOADS

FIELD AND BACKGROUND OF THE INVENTION

The present invention relates to an electronic switch and, more particularly, to an electronic switch designed for quick, automatic, reflex like response to current overloads.

Three types of electronic switches are widely used in the art. The first includes a relay. The second includes a semiconductor. Whereas the third includes both a relay and a semiconductor connected in parallel. Each of these switches has characterizing drawbacks.

Due to its high resistance during service the semiconductor of semiconductor based electronic switches consumes a great amount of energy, heats, and therefore requires a heat dissipation unit to dissipate the heat it generates during service.

Furthermore, the control unit (CPU) of such a semiconductor is not quick enough to substantially immediately monitor and respond to a sudden elevation in the current load, which may lead to a damage to the semiconductor itself and/or to other components of the circuit. Typical response time is in the range of 20–30 milliseconds.

The relay of relay based switches is designed to hold high current loads, associated, for example, with a shortage in the circuit and is therefore bulky and robust.

As before, the control unit (CPU) of such a relay is not quick enough to immediately monitor and respond to a sudden elevation in the current load, which may lead to a damage to the relay itself and/or other components of the circuit. Typical response time is in the range of 20–30 milliseconds.

Furthermore, a spark formation is associated with connecting/disconnecting the contacts of the relay, which results in accumulative damage to the switch which leads to low fidelity.

Under high current overload conditions (e.g., short current) the spark releases an immense amount of heat, which may result in melted contacts, and some times even fire and complete destruction of the switch.

In relay-semiconductor combined switches the spark problem is solved under normal service conditions, however, the CPU of these components faces a serious problem of monitoring the operation state (on or off) of the relay and/or semiconductor since they are connected in parallel. Only when both these components are in the off state, the CPU can assure that this is indeed the case.

The slow monitoring time affects the duration of control and extends the time required for decision making and response. This, in turn, is a major disadvantage in cases of a current overload that can damage the switch or other components of the circuit. Typical response time is in the range of 20–30 milliseconds.

Thus, a common drawback associated with all three prior art switches is the delayed response to a sudden and unexpected elevation in the current load, which latent response may result in a damage to the circuit due to the current load elevation.

It will be appreciated that as the duration along which the relay and/or the semiconductor are subjected to current overload shortens, the consumption which develops is smaller, thereby decreasing the damage.

There is thus a widely recognized need for, and it would be highly advantageous to have, an electronic switch designed for quick and automatic response to current overloads.

SUMMARY OF THE INVENTION

According to the present invention there is provided an electronic switch designed for quick, reflex like, automatic response to current overloads.

According to further features in preferred embodiments of the invention described below, provided is an electronic switch circuit for controlling a main circuit including a power source and a load, the electronic switch circuit comprising (a) an electromagnetic relay device including an electromagnet and at least two contacts, the electromagnetic relay device being connectable in series to the power source and the load of the main circuit; (b) a controlled semiconductor device being a part of the electronic switch circuit; (c) a semiconductor command circuit being connected to the semiconductor device, the semiconductor command circuit serving for controlling the operation of the controlled semiconductor device; (d) a relay command circuit being connected to the electromagnet of the electromagnetic relay device and to the semiconductor command circuit, the relay command circuit serving for controlling the relay device and the semiconductor command circuit; (e) an overload sensor serving for determining a current load flowing through the main circuit and for reporting the relay command circuit of a current overload; and (f) a resistor being connected in series to the controlled semiconductor device, the resistor and the controlled semiconductor device being connected in parallel to the electromagnetic relay device. When the contacts of the relay device are disconnected, the resistor which thereby experiences a higher current load, automatically signals the semiconductor command circuit, which in turn turns the controlled semiconductor device off.

According to still further features in the described preferred embodiments the electronic switch circuit further comprising (g) an inducer being connectable in series to the load, the inducer being positioned in close proximity to the electromagnet of the electromagnetic relay device. When the inducer experiences a current load above a predetermined threshold the inducer generates an induction field of a magnitude sufficient to induce the electromagnet of the electromagnetic relay device to disconnect the contacts.

According to still further features in the described preferred embodiments when the contacts of the relay device are disconnected, the resistor which thereby experiences a higher current load, automatically signals the semiconductor command circuit, which in turn turns the controlled semiconductor device off within about four milliseconds.

According to still further features in the described preferred embodiments the predetermined threshold is greater than about 50 amperes.

According to still further features in the described preferred embodiments the predetermined threshold is greater than about 100 amperes.

According to still further features in the described preferred embodiments when the inducer experiences the current load above the predetermined threshold the inducer generates the induction field sufficient to induce the electromagnet of the electromagnetic relay device to disconnect the contacts within about two milliseconds.

According to still further features in the described preferred embodiments provided is an electronic switch comprising any of the circuits herein described.

The present invention successfully addresses the shortcomings of the presently known configurations by providing an electronic switch designed for quick and automatic response to current overloads, which can be used to provide a nearly immediate, non-delayed, automatic, reflex like, response to a sudden and unexpected elevation in the current load.

BRIEF DESCRIPTION OF THE DRAWINGS

The invention herein described, by way of example only, with reference to the accompanying drawings, wherein.

DESCRIPTION OF THE PREFERRED EMBODIMENTS

Figure 1:
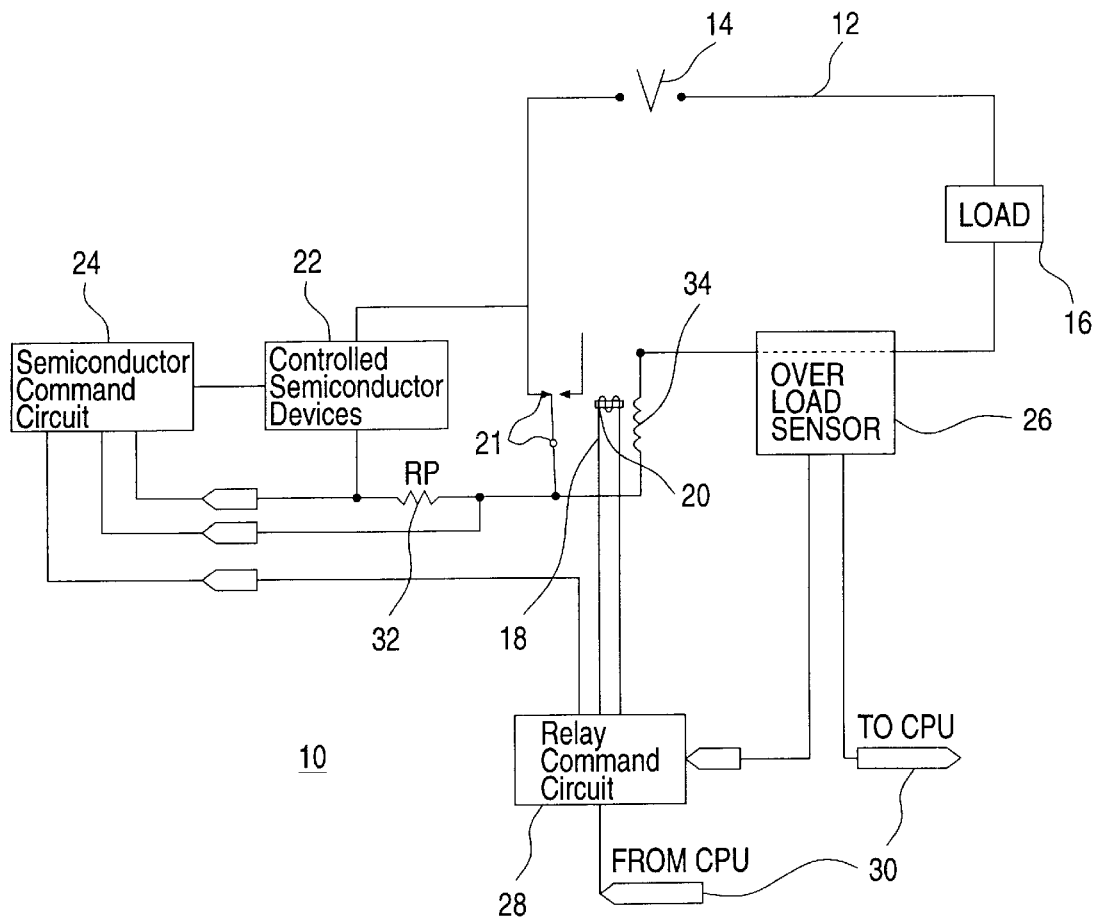
FIG. 1 is a schematic depiction of a circuit employed in the electronic switch according to the present invention.

The present invention is of an electronic switch designed for quick, automatic, reflex like response to current overloads, which can be used to provide a substantially immediate, non-delayed (e.g., below 10, preferably about 6 milliseconds) automatic response to a sudden and unexpected elevation in the current load. Specifically, the present invention can be used to provide a switch of high fidelity, safety and self protective features.

The principles and operation of an electronic switch according to the present invention may be better understood with reference to the drawings and accompanying descriptions.

Referring now to the drawings, FIG. 1 illustrates an electronic switch circuit employed in the electronic switch of the present invention, which is referred to hereinbelow as circuit 10.

Thus, electronic switch circuit 10 serves for controlling a main circuit 12 which includes a power source (V) 14 (e.g., the net) and a load 16 (e.g., any electrically operated device having an internal resistance).

Electronic switch circuit 10 includes an electromagnetic relay device 18. Relay device 18 includes an electromagnet 20 and at least two contacts 21 operated under the influence of the magnetic field generated by electromagnet 20.

Electromagnetic relay device 18 is connectable in series to power source 14 and load 16 of main circuit 12, all as well known in the art. A suitable electromagnetic relay device is distributed by FEME of Italy (Cat. No. MZPA001-44-16).

Electronic switch circuit 10 further includes a controlled semiconductor device 22. Device 22 is connected to circuit 10 and functions as described below.

A controlled semiconductor device suitable for implementation in circuit 10 is described in "MOTOROLA THITYSTOR DEVICE DATA" (Q2/95; DL137/D; REV 6), published by MOTOROLA, on page 1.6–46, FIG. 6.87. Other suitable devices are distributed by MOTOROLA. For example Cat. No. MAC223A6(FP) for 400 V AC; 25 A and Cat. No. MAC224A6(FP) for 400 V AC; 40 A.

Electronic switch circuit 10 further includes a semiconductor command circuit 24. Command circuit 24 is connected to semiconductor device 22 and serves for controlling the operation of controlled semiconductor device 22, as well known in the art. A semiconductor command circuit suitable for implementation in circuit 10 is described in "MOTOROLA THITYSTOR DEVICE DATA" (Q2/95; DL137/D; REV 6), published by MOTOROLA, on page 1.6–30, FIG. 6.60.

Electronic switch circuit 10 further includes an overload sensor 26. Sensor 26 serves for determining (measuring) a current load flowing through main circuit 12. Sensor 26 may be connected in series to load 16, in this case sensor 26 is an ampermeter. However, other configurations wherein current determination is performed indirectly (e.g., via induction) are also possible, as well known in the art.

Electronic switch circuit 10 includes a relay command circuit 28. Circuit 28 is connected to electromagnet 20 of electromagnetic relay device 18, to semiconductor command circuit 24 and to sensor 26.

Relay command circuit 28 serves for controlling relay device 18 and semiconductor command circuit 24. Circuit 28 is connected to sensor 26, which signals circuit 28 when the current load in main circuit 12 exceeds a predetermined mild threshold (e.g., in the range of about 25 amperes), or in other words, when sensor 26 experiences current overload be it mild or high (e.g., above 50 or 100 amperes) current overload, it reports or signals at least to circuit 28.

Electronic switch circuit 10 further includes a resistor 32. Resistor 32 is connected in series to controlled semiconductor device 22, such that device 22 and resistor 32 are together connected in parallel to relay device 18.

When contacts 21 of relay device 18 are disconnected (e.g., start a process of disconnection), resistor 32 which thereby experiences a higher current load and/or voltage, automatically signals semiconductor command circuit 24, which in turn turns controlled semiconductor device 22 off. Device 22 is turned off within about 10 milliseconds, preferably about 7 milliseconds, more preferably about 4 milliseconds, or less following the disconnection of contacts 21 of device 18.

A suitable resistor has a resistance of about 0.5 ohm. Selecting resistor 32 having a suitable resistance limits the development of a high current and thereby protects load 16 and semiconductor device 22.

Alternatively to resistor 32, preferably in addition to resistor 32, electronic switch circuit 10 further includes an inducer 34. Inducer 34 is connectable in series to load 16 of main circuit 12. Inducer 34 is positioned in close proximity (e.g., 0.01–5.0 mm, preferably 0.1–2.0 mm, more preferably 0.5–1.5 mm, most preferably about 1 mm) to electromagnet 20 of electromagnetic relay device 18, such that when inducer 34 experiences a current load above a predetermined high threshold (e.g., above about 50 amperes, preferably above about 100 amperes), inducer 34 generates an induction field of a magnitude sufficient to induce electromagnet 20 of electromagnetic relay device 18 to disconnect contacts 21.

Please note that during service inducer 34 is connected in series to load 16 and that the current which flows through main circuit 12 directly flows also through inducer 34. Inducer 34 may be made of a thick (e.g., 1.5 mm in diameter) metal conductor of about 1 cm in length and may be positioned about 1 mm from electromagnet 20 of relay device 18.

According to a preferred embodiment of the invention contacts 21 are disconnected within about one to three (preferably about two) milliseconds following experiencing a current load above the predetermined high threshold.

In a prefered embodiment of the invention sensor 26 is connected to a control unit (CPU) 30 and also connected to circuit 24, itself also preferably connected to unit 30.

In another prefered embodiment circuit 10 further includes a zero crossing detection circuit (not shown) which under AC conditions may detect a zero cross point, and be used to time the switching of the circuit under normal service conditions, as well known in the art.

The operation of circuit 10 is as follows:

Operation under Normal Service Conditions

Under normal service conditions current flow is directed via contacts 21 of relay device 18 and in parallel via semiconductor device 22 and resistor 32, to inducer 34, sensor 26 and thereafter to load 16.

Still under normal service conditions circuit 10 may be turned from on state to off state by a manual or controlled (CPU) command. Relay command circuit 28 receives the manual or CPU off command, and generates an off command to relay device 18. As a result, contacts 21 disconnect. Once disconnected resistor 32 experiences an elevated current load and therefore command circuit 24 commands device 22 to turn into on state. Thus, spark formation is avoided.

Still under normal service conditions circuit 10 is turned from off state to on state by a manual or controlled (CPU) command. Circuit 28 receives the on command and thereafter commands circuit 24 to command device 22 to turn into on state. Shortly after circuit 28 commands relay device 18 to turn into on state. Again, spark formation is avoided.

Thus, under normal service conditions when relay device 18 turns on or off semiconductor device is on, thereby preventing spark formation. The process as a whole may prolong tens of milliseconds.

Operation under Mild Current Overload

The term "mild current overload" as used herein refers to a current load which affects sensor 36 (e.g., above about 25 amperes) to report to circuit 28, yet is not affecting inducer 34 to affect relay device 18.

When sensor 26 detects an overload it reports to circuit 28. In turn, circuit 28 commands relay device 18 to disconnect the circuit. When contacts 21 of device 18 disconnect, resistor 32 experiences a current overload and as a result circuit 24 commands device 22 to turn off. This response is quick, e.g., within about four milliseconds following the disconnection of contacts 21, semiconductor 22 is off.

Operation under High Current Overload

The term "high current overload" as used herein refers to a current load which affects inducer 34 to induce the disconnection of contacts 21 of relay device 18, e.g., above 50 or 100 amperes.

In this case the current that flows through inducer 34 induces electromagnet 20 of relay device 18 to disconnect contacts 21. This action is very fast and in a prefered embodiment of the invention prolongs about one to three milliseconds, typically about two milliseconds.

As contacts 21 disconnect, resistor 32 experiences an elevation in current load and/or voltage and signals circuit 24 to turn semiconductor device 22 off. This action is completed about four milliseconds later, as described above.

Thus, inducer 34 and resistor 32 act synergistically as reflexes in a case of a high current overload to disconnects the circuit within about six milliseconds. This immediate response ensures that damage to the circuit, switch or any of their associated components, e.g., the load, is effectively prevented. Furthermore, the short response time permits the use of smaller and cost effective electrical components instead of bulky and robust components combined with high heat dissipation capabilities.

Experiments have shown that shorting a house hold load (220 V AC) is followed by an overload current which may develop within two milliseconds to values exceeding 1,000 amperes, some times (no fuse present) the current may reach 10,000 amperes within that time period.

Using the switch of the present invention ensured that within two milliseconds following the short, the measured current was limited to 400 amperes. This value sustained for additional four milliseconds, after which no measurable current was detected.

Concomitantly, sensor 26 also senses the current overload and initiates a sequence of events by signaling, for example, circuit 28, to eventually turn the whole circuit off.

While the invention has been described with respect to a limited number of embodiments, it will be appreciated that many variations, modifications and other applications of the invention may be made.

What is claimed is:

1. An electronic switch circuit for controlling a main circuit including a power source and a load, the electronic switch circuit comprising:

(a) an electromagnetic relay device including an electromagnet and at least two contacts, said electromagnetic relay device being connectable in series to the power source and the load of the main circuit;

(b) a controlled semiconductor device being a part of the electronic switch circuit;

(c) a semiconductor command circuit being connected to said controlled semiconductor device, said semiconductor command circuit serving for controlling the operation of said controlled semiconductor device;

(d) a relay command circuit being connected to said electromagnet of said electromagnetic relay device, said relay command circuit serving for controlling said electromagnetic relay device;

(e) an overload sensor serving for determining a current load flowing through the main circuit and for reporting to said relay command circuit of a current overload;

(f) a resistor being connected in series to said controlled semiconductor device, said resistor and said controlled semiconductor device being connected in parallel to said electromagnetic relay device; and (g) an inducer being connectable in series to the load, said inducer being positioned in close proximity to said electromagnet of said electromagnetic relay device;

wherein when said inducer experiences a current load above a predetermined threshold said inducer generates an induction field of a magnitude sufficient to induce said electromagnet of said electromagnetic relay device to disconnect said contacts, whereas when said contacts of said electromagnetic relay device are disconnected, said resistor which thereby experiences a higher current load, automatically signals said semiconductor command circuit, which in turn turns said controlled semiconductor device off.

2. The electronic switch circuit of claim 1, wherein said relay command circuit is further connected to said semiconductor command circuit and serves for controlling said semiconductor command circuit.

3. The electronic switch circuit of claim 1, wherein when said contacts of said electromagnetic relay device are disconnected, said resistor which thereby experiences a higher current load, automatically signals said semiconductor command circuit, which in turn turns said controlled semiconductor device off within about four milliseconds.

4. The electronic switch circuit of claim 1, wherein said predetermined threshold is greater than about 50 amperes.

5. The electronic switch circuit of claim 1, wherein said predetermined threshold is greater than about 100 amperes.

6. The electronic switch circuit of claim 1, wherein when said inducer experiences said current load above said predetermined threshold said inducer generates said induction field sufficient to induce said electromagnet of said electromagnetic relay device to disconnect said contacts within about one to three milliseconds.

* * * * *